United States Patent [19]

Tyree, Jr.

[11] 4,333,318
[45] Jun. 8, 1982

[54] $CO_2$ FREEZER

[76] Inventor: Lewis Tyree, Jr., 145 Briarwood Ave., North, Oak Brook, Ill. 60521

[21] Appl. No.: 259,968

[22] Filed: May 4, 1981

[51] Int. Cl.³ ............................................ F25D 17/02
[52] U.S. Cl. ...................................... 62/374; 62/380; 198/952
[58] Field of Search ................ 62/374, 375, 380, 381, 62/63, 266; 198/952

[56] References Cited

U.S. PATENT DOCUMENTS

| | | | |
|---|---|---|---|
| 3,402,568 | 9/1968 | Kamin et al. | 62/380 |
| 3,815,377 | 6/1974 | Tyree, Jr. | 62/62 |
| 3,871,185 | 3/1975 | Harper et al. | 62/63 |
| 4,086,783 | 5/1978 | Wagner et al. | 62/374 |
| 4,186,566 | 2/1980 | AuYoung | 62/380 |

OTHER PUBLICATIONS

KwikFreeze Brochure (1979).

*Primary Examiner*—Ronald C. Capossela
*Attorney, Agent, or Firm*—Fitch, Even, Tabin, Flannery & Welsh

[57] ABSTRACT

A $CO_2$ food freezer has an elongated enclosure through which material to be cooled is carried on an endless porous belt conveyor with an upper operating belt run vertically spaced from the lower return run to provide an intermediate region therebetween. Liquid $CO_2$ injection means is located in an upper region to direct $CO_2$ snow plus cold $CO_2$ vapor downward onto material being conveyed. Blowers aimed at an angle of between about 5° and about 35° upward from the horizontal are located in the intermediate region, and fans in the upper region direct $CO_2$ vapor downward onto material on the belt. The belt includes a plurality of longitudinally spaced transverse rods and a plurality of wire sections that respectively interconnect adjacent rods in pairs. The wire sections are bent so that all segments of wire extending generally between said rods lie in substantially the same plane which constitutes the upper surface of the upper run. The rods effectively deflect cold $CO_2$ vapor from the blowers upward against the undersurface of material being carried along the belt and assure efficient freezing is accomplished.

10 Claims, 5 Drawing Figures

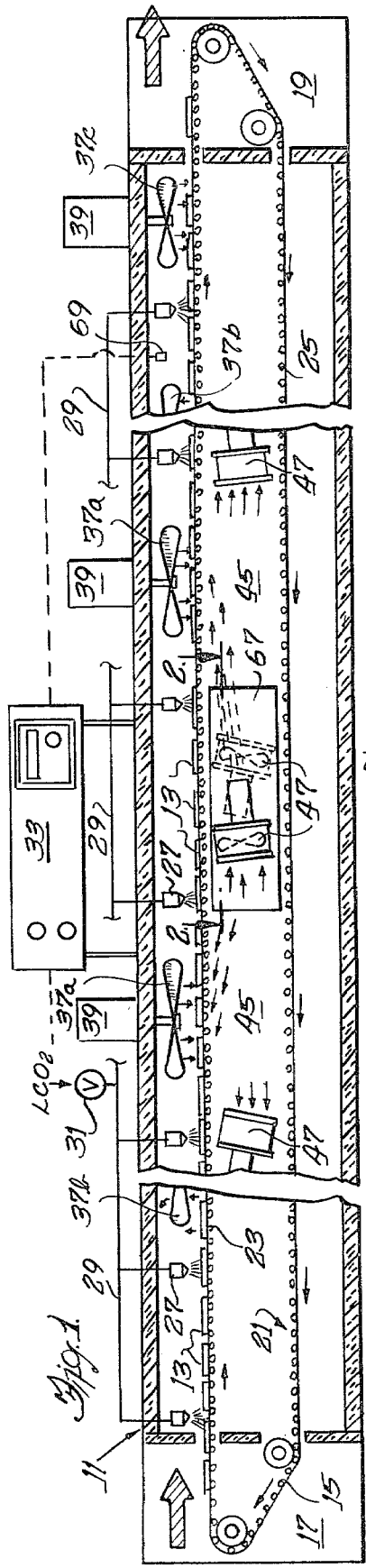
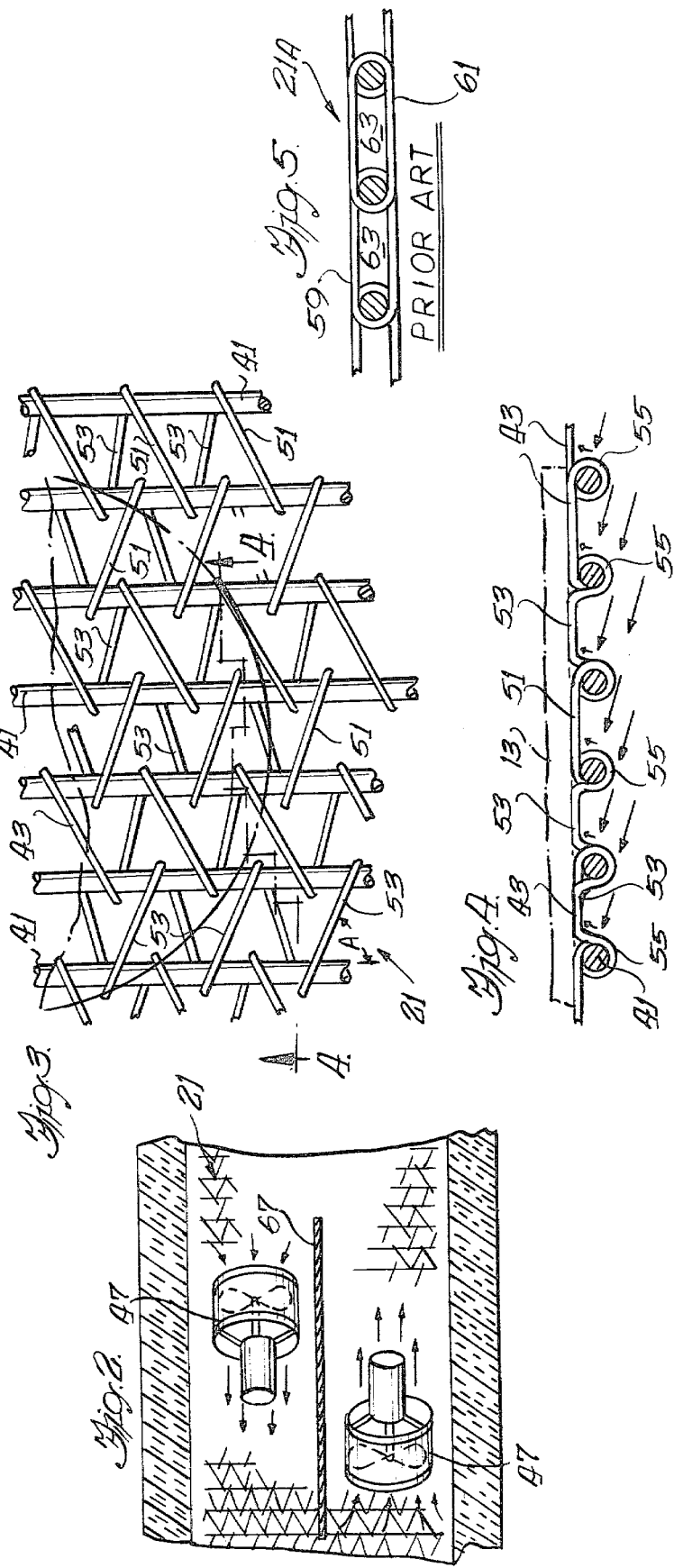

4,333,318

CO₂ FREEZER

This invention relates to cryogenic cooling of material being moved through an insulated enclosure, and more specifically to the freezing of relatively flat patties which are being carried through an insulated tunnel on an open mesh wire conveyor belt using a cryogen, such as carbon dioxide.

BACKGROUND OF THE INVENTION

Mechanical refrigerators, including those of the air-blast type, have long been used for cooling and freezing articles, such as food products. More recently, systems employing a cryogen, such as liquid nitrogen or liquid carbon dioxide, have become commercially important, particularly in the food market. Carbon dioxide is excellently suited for the cooling and/or freezing of food material because it exhibits the advantages of exceptional cooling efficiency at a temperature which is relatively close to the freezing point of water and thus does not cause fracturing problems in the surface of food products.

Various systems have been developed to utilize the refrigeration advantages of carbon dioxide, and U.S. Pat. No. 3,815,377, issued June 11, 1974 to Lewis Tyree, Jr., discloses an insulated freezing tunnel designed for using carbon dioxide to freeze food articles being carried along an endless conveyor. The patent discloses a particularly efficient snow-making system wherein overhead nozzles are employed to direct a spray of carbon dioxide snow particles and cold vapor downward onto the food articles being transported therepast upon the endless conveyor. Improvements in cooling and/or freezing systems of this type which will perform more economically and/or efficiently are constantly being sought after.

SUMMARY OF THE INVENTION

The invention provides a food freezer having an endless wire mesh belt conveyor with its upper and lower runs vertically spaced apart to provide an intermediate region therebetween. CO₂ injection means is located above the belt to direct snow and vapor downward thereupon, and fans are also located in the upper region of the enclosure. Blowers are located in the intermediate region and oriented at an angle of between 5° and 35° upward from the horizonal. The conveyor belt is constructed of a plurality of transverse rods that are interconnected by wire sections which individually span a pair of rods; the wire sections are formed so that the bent segments of wire extending between the rods all lie in substantially the same plane constituting the upper surface of the belt upon which unpackaged food patties rest. The intermediate region blowers direct currents of cold vapor that impinge upon the transverse rods, which act as deflecting vanes and effectively direct the cold vapor currents upward against the undersurface of the food patties—surprisingly effecting freezing upward from the undersurface and resulting in the particularly efficient freezing of food patties.

BRIEF DESCRIPTION OF THE DRAWINGS

FIG. 1 is an elevation view of a cryogenic freezing tunnel embodying various features of the invention with portions of the insulated enclosure being shown in section;

FIG. 2 is a fragmentary sectional view taken generally along the line 2—2 of FIG. 1;

FIG. 3 is a fragmentary plan view, enlarged in size, of the endless conveyor belt employed in the freezer shown in FIG. 1;

FIG. 4 is a sectional view taken along line 4—4 of FIG. 3; and

FIG. 5 is a sectional view similar to FIG. 4 showing an open mesh wire conveyor belt as used in the prior art.

DETAILED DESCRIPTION OF THE PREFERRED EMBODIMENT

Shown in FIG. 1 is an insulated elongated enclosure or tunnel 11 through which material to be frozen, such as unpackaged food patties 13, is transported on an endless conveyor 15 from an entrance end 17 to an exit end 19. The food patties 13 are placed upon the endless conveyor 15 at the entrance end and removed at the exit end by apparatus of a type well known in the art which forms no part of the present invention. The conveyor 15 includes a wire open mesh belt 21 of a particular design and is driven in the customary manner in the direction shown by the arrows in FIG. 1 so that an upper run 23 of the conveyor moves from left to right and a lower or return run 25 moves from right to left. In order to best make economical use of the freezing system, the material to be frozen or cooled, preferably hamburger patties 13 or the like, are disposed in aligned transverse rows across the belt 21, which rows are closely spaced for most efficient overall operation.

A plurality of cryogen injection devices 27 are provided in the regions above the conveyor belt which are supported from the top wall of the enclosure or tunnel and are connected to one or more cryogen headers 29. As indicated, the preferred cryogen is liquid carbon dioxide, and the injection devices 27 are preferably spring-loaded to the closed position as described in detail in U.S. Pat. No. 3,815,377, the disclosure of which is incorporated herein by reference. These devices 27 each have a variable nozzle, the orifice area of which varies as a result of the liquid CO₂ pressure at the device, which is determined by a modulating valve 31 located upstream of the header 29 that is regulated by a main control system 33. Accordingly, as the pressure of liquid CO₂ applied to the headers 29 is increased, the flow rate of cryogen through the injection devices 27 not only increases because of the higher fluid pressure, but also because of the increasing orifice areas. As also described in the aforesaid patent, other controls may be used to obtain desired liquid CO₂ injection.

Also preferably disposed in the upper region of the tunnel are a plurality of fans 37, each of which is connected by a shaft that extends through the insulated top wall to an electric motor 39 disposed exterior of the tunnel. As depicted in FIG. 1, some of the fans 37a and 37c circulate the cold vapor downward against the upper surface of the articles 13 being carried along the conveyor while other of the fans 37b draw the cold vapor upward within the tunnel. In order to obtain a uniform pattern of CO₂ snow across the entire width of the conveyor belt 21, a plurality of injection devices 27 will normally be provided at each longitudinal station so as to obtain the desired coverage, e.g., 3–5 or more devices may be connected to transverse or equivalent subheaders. Similarly, a plurality of fans 37 could be provided at each longitudinal station; however, by appropriately sizing the fan blade, it has been found that a single fan at each location will usually suffice to create the desired vapor movement for conveyor belts of the usual width.

The combination of impinging some $CO_2$ snow on the upper surface of the patties 13, plus the direct downward impingement of the cold vapor within the tunnel 11, effectively removes the heat from the patties and freezes the upper portion of the patties as they are transported through a tunnel of some reasonable length at a fairly substantial rate of speed. It is, however, somewhat more difficult and thus takes longer to remove the heat from and freeze the lower portions of the food patties, and the present improvement is primarily directed to accomplishing this objective.

As best seen in FIGS. 3 and 4, the endless conveyor belt 21 is made using a plurality of transverse rods 41 of circular cross section which link together a plurality of wire units or sections 43 formed from metal wire of circular cross section. Inasmuch as some heat is removed from the unpackaged food patties via conductive heat-transfer through the metal wire, a metal having a heat-conductivity at least about as great as that of stainless steel is preferably used for both the wire units 43 and the transverse rods 41. Viewed oppositely, the patties 13 sufficiently warm the low mass wire units 43 to prevent $CO_2$ snow from collecting thereabout. The wire units are formed in an unusual configuration as described in detail hereinafter.

As illustrated in FIG. 1, the upper or working run 23 of the endless conveyor belt 21 is vertically separated a substantial distance from the lower or return run 25 of the conveyor belt so as to create an intermediate region 45 therebetween. The vertical dimension of this region 45 is preferably equal to at least about one-third of the vertical interior height of the insulated tunnel 11. Disposed in this region are a plurality of blowers 47 which are individually oriented to discharge cold vapor upwardly at an angle between 5° and 35° above the horizontal as depicted in FIG. 1. Each of the blowers 47 includes a rotary blade that is powered by an electric motor and disposed within a surrounding sleeve. The discharge of each blower is past the motor casing so as to quickly dissipate the heat of the electric motor. As shown in FIG. 1, the blowers 47 are arranged to create fairly high velocity currents of cold vapor which move generally in both directions from about the center of the tunnel and which are oriented toward the underside of the upper run 23 of the conveyor belt. Because of the particular design of the conveyor belt, the transverse rods 41 serve as effective deflecting vanes.

As best seen in FIGS. 3 and 4, each of the wire units 43 is made up of a plurality of alternating straight wire segments 51 and a plurality of parallel wire segments 53 of generally inverted U-shape. These alternating segments are interconnected by curved interconnections 55 which constitute the bend of the wire around the rod 41 and which respectively join one straight segment 51 to the next inverted U-shape segment 53. The interconnections 55 are proportioned to fit loosely about the surface of the cylindrical rods 41. As best seen in FIG. 3, the straight segments 51 are arranged so as to lie atop against pairs of rods 41 in the upper run of the conveyor, and the inverted U-shape segments 53 extend upward between the rods. Accordingly, the major fraction of the wire which forms the wire sections 43 lies generally in the upper plane that constitutes the surface upon which the food patties 13 rest. As a result, the longitudinal length of the wire required to form the individual units 43 is less than was employed in the prior art type of wire mesh conveyor belts 21A (illustrated in FIG. 5) because the major portion of the length of the inverted U-shape segments 53 constitutes a part of the upper support surface and thus fills what would otherwise be a gap between the parallel, straight wire segments 51, allowing the spacing between adjacent parallel straight wire segments in each wire unit 43 to be increased. In this respect, the substantially straight central portion of each inverted U-shape segment 53 is equal to at least about 50 percent of the length of the straight segment. Moreover, the acute angle A (FIG. 3) which each of the straight segments forms with each of the transverse rods 41 is determinative of the spacing between adjacent segments, and it is preferably between about 60° and about 75°.

In addition to using less metal wire than was employed in the prior art wire mesh belts 21A (because of this gap-filling function of the alternating inverted U-segments 53), this arrangement eliminates the build-up of snow and food particles in the regions of the open links which was a substantial problem with respect to prior art belts. As depicted in FIG. 5, the prior art wire mesh belt 21A was symmetrical, with its upper and lower surfaces 59,61 being substantially the same, thus defining essentially a pair of planar surfaces. The lower surface 61 of the wire links never came in contact with the material being frozen and thus remained quite cold, and the middle region 63 between these upper and lower surfaces in the prior art belt of the open wire mesh type tended to accumulate food particles and carbon dioxide snow throughout the day as the freezer was in continuous use. As a result, vapor flow through the belt 21A would slowly decrease, and more importantly, the use of such a belt would prevent achievement of the bottom cooling effect that is an important feature of the present invention. The build-up of snow in the interstices 63 between the upper and lower surfaces of prior art wire mesh belts 21A would tend to block the flow of vapor currents of the type created by blowers 47 disposed in the intermediate region 45, thus negating the vane-effect of the transverse rods which is utilized to obtain the increased cooling effect. Particularly for food items of large size, belts of slightly different design utilizing transverse rods and/or other equivalent deflecting devices might be employed.

To obtain this bottom cooling effect without blowing a large amount of vapor out one end of the tunnel freezer 11 and possibly unbalancing the overall cooling operation, an even number of blowers 47 are preferably provided in the intermediate region 45, with half of them being directed toward each longitudinal end. Preferably, a pair of the blowers 47 are provided at about the longitudinal center of the tunnel, as depicted in FIG. 2, on opposite sides of a central vertical baffle 67. In flanking relationship to these blowers are a pair of overhead fans 37a which are directed downwardly. Flanking the fans 37a is another pair of blowers 47 which take suction generally from the region below the downwardly directed fans 37a. There may be additional downwardly directed fans 37c included; however, somewhere between the ends of the tunnel and the outermost pair of blowers 47 there preferably are a pair of upwardly directed fans 37b, particularly when the tunnel is greater than about 35 feet long.

As an example of one commercial embodiment of the freezer 11 designed for freezing hamburger patties 13 of the general type served in fast-food restaurants, an endless wire mesh conveyor belt 21 is provided about 26 inches in width. The belt 21 is fabricated as shown in FIGS. 3 and 4 with the transverse rods 41 being about ¼ inch in diameter and being disposed on about one inch centers and with the parallel segments 53 being spaced about ¾" from one another. The freezer conveyor has a variable speed drive, but when operating at design speed in a 60-foot long tunnel will run at a velocity of about 30 feet per minute. The hamburger patties 13 are placed three, four or five abreast (depending on size) in transverse rows, which rows are separated by a distance of only about ¼ inch. They are transported through the freezer, entering at an average temperature of about 35° F. and exiting substantially completely frozen at a temperature below 20° F.

An insulated tunnel 11 between about 40 and 60 feet long may contain four blowers 47, arranged as depicted in FIG. 1 in the intermediate region 45. Each of the blowers 47 discharges cold $CO_2$ vapor at a rate of about 10 feet per second. Banks of $CO_2$ injection devices 27 are spaced longitudinally along the length of the tunnel, usually with 4 injection units in each bank so as to provide a snow pattern generally uniformly across the entire width of the endless conveyor belt 21. In the tunnel of this length, there may be such banks of $CO_2$ injection devices 27. All of the banks of devices may be fed from a single supply header 29 of liquid $CO_2$ controlled by a single modulating valve 31, or two or more separate headers may be employed with additional modulating valves so as to allow for varying of the rate at which $CO_2$ snow is created in the various longitudinal regions of the tunnel. A pair of downwardly directed fans 37a are provided in flanking location to the two side-by-side blowers 47, and additional fans are provided along the length of the tunnel with some fans 37c directed downward and some fans 37b directed upward so as to assure that continuous movement of the cold vapor is achieved within the tunnel. Additionally, an exhaust system is located adjacent each end of the tunnel to remove the $CO_2$ vapor and vent it to a location exterior of the plant. Such exhaust systems are well known in the art.

In order to control the overall operation and assure that efficient freezing is effected, an overall control system 33 is provided which operates using at least one temperature sensor 69 located in the insulated tunnel at a location generally near the exit end, downstream from the last blower 47. The general means of control is by varying the pressure of fluid supplied to the $CO_2$ header 29 which has a dual effect upon the $CO_2$ injection devices 27. The spring-loaded devices 27 when subjected to a higher pressure, enlarge the orifice area of the nozzle through which the liquid $CO_2$ is being ejected which, coupled with the higher fluid pressure head, increases the amount of $CO_2$ being expanded per increment of time. Although variable speed motors could be provided for the fans and/or the blowers, so as to even more precisely adapt the freezer to varying rates of product throughput, generally adequate control is achieved simply by the employment of one or more modulating valves in the supply lines for the liquid $CO_2$.

Although the apparatus has generally been described as a food freezer, it should be understood that a temperature below 32° F. need not be achieved in the material carried along the conveyor and that the apparatus can be also efficiently employed to effect the cooling of material to a temperature above freezing. Likewise, although the greatest commercial use presently forseen is in the freezing of food patties or the like, it could also be efficiently used to cool or freeze other articles, including non-food articles.

Although the invention has been described with regard to a preferred embodiment, it should be understood that changes and modifications as would be obvious to one having the ordinary skill in this art may be made without deviating from the scope of the invention which is defined solely by the claims appended hereto. Particular features of the invention are emphasized in the claims that follow.

What is claimed is:

1. A $CO_2$ comprising means defining an elongated enclosure having an entrance at one end and an exit at the opposite end, an endless porous belt conveyor for carrying material to be cooled along a path from said entrance to said exit, said endless belt having an upper operating run and a lower return run which are vertically spaced apart to provide an intermediate region therebetween, $CO_2$ injection means located in said enclosure to expand high pressure liquid $CO_2$ through a nozzle to create $CO_2$ snow plus cold $CO_2$ vapor, and blower means located in said intermediate region and aimed at an angle of between about 5° and about 35° upward from the horizontal, said belt including a plurality of longitudinally spaced transverse rod means and a plurality of belt sections which are interconnected by said transverse rod means whereby said belt effectively deflects cold $CO_2$ vapor being discharged by said blower means upward against the undersurface of mateial being carried along said endless belt.

2. A freezer in accordance with claim 1 wherein said belt sections are wire units that extend transversely across said path, said rod means respectively interconnect adjacent pairs of said wire units, and said wire units each being bent so that all segments of wire extending generally between said rod means lie in substantially the same plane and constitute the upper surface of said belt in said upper run.

3. A freezer in accordance with claim 2 wherein each of said wire units includes a plurality of parallel straight wire segments, a plurality of parallel wire segments of generally inverted U-shape and two sets of curved wire interconnections that respectively join one straight segment to one U-shape segment and that are proportioned to fit about the surface of one of said rod means which are circular in cross section.

4. A freezer in accordance with claim 3 wherein the length of the central portion of each of said U-shape segments is equal to at least about 50% of the length of said straight segments.

5. A freezer in accordance with claim 1 wherein said $CO_2$ injection means are located in an upper region and spaced longitudinally along said enclosure to direct the gaseous environment downward onto material being carried along said upper run of said belt.

6. A freezer in accordance with claim 1 wherein fan means are located in said upper region of said enclosure and are oriented to direct $CO_2$ vapor downward onto material on said belt.

7. A freezer in accordance with claim 6 wherein said fan means are located longitudinally between said $CO_2$ injection means which are spaced longitudinally in an upper region of said enclosure.

8. A freezer in accordance with claim 7 wherein additional fan means are located in said upper region and are operable to draw cold vapor upward through said porous belt from the bottom of said enclosure.

9. A freezer in accordance with claim 1 wherein a pair of said blower means are disposed at about the same longitudinal location about midway between said entrance and said exit, with one aimed toward said entrance and the other aimed toward said exit, and wherein longitudinally extending vertical baffle means is located between said pair.

10. A freezer in accordance with claim 9 wherein each of said parallel wire segments forms an acute angle of between about 60° and about 75° with said transverse rod means.

* * * * *

UNITED STATES PATENT AND TRADEMARK OFFICE
CERTIFICATE OF CORRECTION

PATENT NO. : 4,333,318

DATED : June 8, 1982

INVENTOR(S) : Lewis Tyree, Jr.

It is certified that error appears in the above—identified patent and that said Letters Patent is hereby corrected as shown below:

Column 3, line 62, change "against" to --adjacent--.

Column 6, line 13, after "$CO_2$", insert --freezer--.

Signed and Sealed this

Seventh Day of September 1982

[SEAL]

Attest:

Attesting Officer

GERALD J. MOSSINGHOFF

Commissioner of Patents and Trademarks